United States Patent [19]
Damerow et al.

[11] Patent Number: 6,122,154
[45] Date of Patent: *Sep. 19, 2000

[54] MOTOR STARTING DEVICE AND PROTECTOR MODULE WITH MOTOR STARTER CUT-OUT SWITCH

[76] Inventors: Robert William Damerow, 522 Christopher St., Morrison, Ill. 61270; Raphael A. Gonzalez, 1725 Hillcrest Dr., Sterling, Ill. 61081; Kenneth Ray Renkes, 16387 Wayne Rd., Morrison, Ill. 61270

[*] Notice: This patent issued on a continued prosecution application filed under 37 CFR 1.53(d), and is subject to the twenty year patent term provisions of 35 U.S.C. 154(a)(2).

[21] Appl. No.: 08/847,446

[22] Filed: Apr. 24, 1997

[51] Int. Cl.[7] .................................................. H02H 5/04
[52] U.S. Cl. ............................... 361/32; 361/24; 361/105
[58] Field of Search .................................. 361/23, 24, 25, 361/26, 27, 28, 29, 31, 32, 103, 105, 106; 310/68 C; 318/785, 788, 791, 792, 794, 795

[56] References Cited

U.S. PATENT DOCUMENTS

| | | | |
|---|---|---|---|
| Re. 31,367 | 8/1983 | D'Entremont | 172/369 |
| 3,562,587 | 2/1971 | Forst | 361/27 |
| 3,569,781 | 3/1971 | Strachan | 318/788 |
| 3,683,250 | 8/1972 | Fricker | 62/115 |
| 3,695,054 | 10/1972 | Barry | 361/27 |
| 3,718,879 | 2/1973 | Perry | 337/95 |
| 3,761,792 | 9/1973 | Whitney et al. | 318/788 |
| 3,794,950 | 2/1974 | Kilner | 338/23 |
| 3,846,674 | 11/1974 | McNulty | 361/27 |
| 3,878,436 | 4/1975 | Bogel | 361/72 |
| 3,935,511 | 1/1976 | Boulanger et al. | 361/58 |
| 3,955,170 | 5/1976 | Geischecker | 338/22 SD |
| 3,988,709 | 10/1976 | McKinnon et al. | 338/57 |
| 4,025,833 | 5/1977 | Lawton | 318/781 |
| 4,042,860 | 8/1977 | Woods et al. | 361/25 |
| 4,084,202 | 4/1978 | Stoll | 361/24 |
| 4,084,406 | 4/1978 | Brenneman | 62/211 |
| 4,092,573 | 5/1978 | D'Entremont | 318/221 C |
| 4,131,871 | 12/1978 | Haag et al. | 338/220 |
| 4,161,681 | 7/1979 | Rathje | 318/783 |
| 4,237,508 | 12/1980 | Woods et al. | 361/24 |

(List continued on next page.)

FOREIGN PATENT DOCUMENTS

| | | | |
|---|---|---|---|
| 0075138 | 8/1982 | European Pat. Off. | H02P 1/42 |
| 0590592A1 | 9/1993 | European Pat. Off. | H02P 1/42 |
| 2301714A | 5/1996 | United Kingdom | H02K 11/00 |

OTHER PUBLICATIONS

European Search Report, dated Aug. 5, 1998, pp. 1–3.

*Primary Examiner*—Ronald W. Leja
*Attorney, Agent, or Firm*—Carl B. Horton, Esq.; Damian Wasserbauer, Esq.; Amstrobng Teasdale LLP

[57] ABSTRACT

Embodiments of a combination motor starting device and protector module including a motor start winding cut-out switch for an electric motor are described. In the one embodiment, the motor protector includes a heater element and a bimetallic protector switch, electrically connected in series and configured to be coupled between a power source and the motor windings. The bimetallic protector switch includes a stationary contact, a movable contact, and a bimetal element, responsive to current flow through the protector, controls movements of the movable contact. The heater element is positioned in heat transfer relationship with the protector bimetal element. The motor starting device, in one form, is a positive temperature coefficient resistor (PTCR) element configured to be connected in circuit with the motor start winding. A bimetallic cut-out switch is connected in series with the PTCR. The bimetallic cut-out switch includes a movable conducting element and a bimetal element controls movement of the movable conducting element. The bimetal element of the cut-out switch is positioned in heat transfer relationship with the above described heater element.

14 Claims, 1 Drawing Sheet

U.S. PATENT DOCUMENTS

| | | | |
|---|---|---|---|
| 4,237,510 | 12/1980 | Thompson, Jr. et al. | 361/24 |
| 4,241,494 | 12/1980 | Woods | 29/619 |
| 4,292,555 | 9/1981 | Schaefer | 310/68 R |
| 4,325,012 | 4/1982 | Schaefer | 318/786 |
| 4,325,051 | 4/1982 | Rodriquez | 338/220 |
| 4,327,481 | 5/1982 | Woods | 29/619 |
| 4,334,162 | 6/1982 | Haag et al. | 310/68 C |
| 4,387,412 | 6/1983 | Woods et al. | 361/27 |
| 4,410,924 | 10/1983 | Hewitt et al. | 361/25 |
| 4,422,120 | 12/1983 | Kobayashi et al. | 361/24 |
| 4,423,405 | 12/1983 | Bar | 338/25 |
| 4,446,500 | 5/1984 | Grenier et al. | 361/103 |
| 4,446,501 | 5/1984 | Peterson et al. | 361/114 |
| 4,467,385 | 8/1984 | Bandoli et al. | 361/24 |
| 4,492,886 | 1/1985 | Bar | 310/68 C |
| 4,493,144 | 1/1985 | Woods et al. | 29/622 |
| 4,499,517 | 2/1985 | Lisauskas | 361/24 |
| 4,574,229 | 3/1986 | Kim | 318/788 |
| 4,683,515 | 7/1987 | Beihoff et al. | 361/106 |
| 4,689,595 | 8/1987 | Jergensen | 337/107 |
| 4,701,824 | 10/1987 | Beggs et al. | 361/24 |
| 4,706,152 | 11/1987 | DeFilippis et al. | 361/32 |
| 4,862,306 | 8/1989 | Lisauskas | 361/24 |
| 5,021,915 | 6/1991 | Wandler et al. | 361/26 |
| 5,023,529 | 6/1991 | Tennant | 318/266 |
| 5,053,908 | 10/1991 | Cooper et al. | 361/24 |
| 5,055,726 | 10/1991 | D'Entremont et al. | 310/71 |
| 5,212,436 | 5/1993 | Nacewicz et al. | 318/788 |
| 5,262,704 | 11/1993 | Farr | 318/434 |
| 5,291,085 | 3/1994 | Kawashima et al. | 310/68 C |
| 5,345,126 | 9/1994 | Bunch | 310/68 C |
| 5,391,971 | 2/1995 | Yamada et al. | 318/778 |
| 5,451,853 | 9/1995 | Itoh | 318/788 |
| 5,463,874 | 11/1995 | Farr | 62/126 |

MOTOR STARTING DEVICE AND PROTECTOR MODULE WITH MOTOR STARTER CUT-OUT SWITCH

FIELD OF THE INVENTION

This invention relates generally to a device useful in assisting with starting and protecting a dynamoelectric machine and, more particularly, to a combination motor starting device and motor protection module including a motor starter cut-out switch.

BACKGROUND OF THE INVENTION

Dynamoelectric machines such as motors typically include a start or auxiliary winding and a run winding. The start or auxiliary winding is utilized to initiate rotation of the motor rotor. Particularly, the magnetic field generated by the relatively high inductive reactance start winding in a resistance split phase motor may be about 30° out-of-phase (in both a physical sense and a time sense) with respect to the field generated by the relatively lower inductive reactance run winding. When the run and start windings are energized, the geometric and time phase relationship between magnetic fields generated by the run and start windings, and the magnetization of the rotor, cause the rotor to begin rotating from a standstill condition. Once the rotor has sufficient torque to attain its normal running speed, the start winding is "cut-out" of the motor circuit so that the out-of time phase geometrically spaced magnetic field generated by the start winding does not adversely impact motor operation.

Start and run capacitors sometimes are utilized in two capacitor or capacitor-start-capacitor-run motors to change the time phase relationship between the magnetic fields generated by the run and start or auxiliary windings. A start capacitor connected in series circuit with a start or auxiliary winding causes the magnetic field generated by the start winding to be, for example, about 90° (rather than about 30°) out-of-time with the run winding field. As compared to a 30° time phase shift, a 90° time phase shift of the start winding magnetic field results in a higher starting torque, which is desirable in some applications.

Also, rather than switching out the start winding once sufficient rotor torque is attained, the start winding can be utilized as a auxiliary run winding after motor start-up if a run capacitor is connected in series circuit with the start winding. Particularly, the start winding and run capacitor remain in the motor circuit. Such a configuration results in better motor efficiency and power factor.

A motor starting switch may be employed to control the energization and de-energization of the motor start winding or start capacitor connection with an auxiliary winding. A positive temperature coefficient resistor (PTCR), for example, may be used to perform this switching function. Such devices have been used particularly for many compressor motor applications.

A typical PTCR has a low resistance when cool but has an extremely high resistance when hot. The PTCR is connected, for example, in series circuit with the start winding. The temperature/resistance characteristic of the PTCR is selected so that the PTCR has a high resistance once the motor attains its normal running speed. Such a configuration provides the result that the start winding is substantially disassociated from the motor power supply after motor start-up. Of course, if a run or a start capacitor, or both, are coupled to the motor, alternative electrical connections can be made between the PTCR, start winding and capacitors.

Due to the temperature/resistance characteristics of known PTCRs, and as explained above, the PTCR must be maintained at the high temperature in order to maintain the start winding substantially disassociated from the motor power supply after motor start-up. Maintaining the PTCR at the high temperature, however, results in the consumption of energy which is lost as heat.

An object of the present invention is to provide a combination module for a motor protector and a motor starting device which includes a PTCR but substantially eliminates the requirement that the PTCR be maintained at a high temperature for the motor start winding to remain substantially disassociated from the motor power supply after motor start-up.

SUMMARY OF THE INVENTION

These and other objects of the invention are attained by several forms of apparatus which, in one embodiment, is a combination motor starting and protector module including a motor start winding cut-out switch for an electric motor. In the one embodiment, the motor protector includes a heater element and a bimetallic protector switch electrically connected in series and configured to be coupled between a power source and the motor windings. The bimetallic protector switch includes a stationary contact, a movable contact, and a bimetal element. The bimetal element is responsive to current flow through the protector and controls movements of the movable contact. The heater element is positioned in heat transfer relationship with the bimetal element.

The motor starting device, in one form, is a positive temperature coefficient resistor (PTCR) configured to be connected in circuit with the motor start winding. A bimetallic cut-out switch is electrically connected in series with the PTCR. The bimetallic cut-out switch includes a movable conducting element and a bimetal element which controls movement of the movable conducting element. The bimetal element of the cut-out switch is positioned in heat transfer relationship with the heater element of the motor protector.

In operation, the PTCR has a low resistance when cool, and the PTCR initially enables sufficient current to flow through the motor start winding so that the start winding magnetic field effects a desired starting torque during the start-up period. If the motor start winding is in series circuit with the PTCR, as the temperature of the PTCR increases in response to current flow therethrough to the PTCR anomaly or transition temperature, the PTCR resistance to current flow increases to a value which generally renders the start winding ineffective so as to electrically disassociate the start winding from the run winding.

In addition, and with respect to the bimetallic cut-out switch, when the bimetal element is heated to the calibrated "transition" temperature, the bimetal element "transitions", and moves the movable conducting element into a circuit-breaking condition. In such a circuit-breaking condition, the motor start winding is de-energized and the PTCR is completely disassociated from the power source. As a result, the PTCR cools and does not consume energy, yet the motor start winding remains disassociated from the motor run winding while the motor continues to run.

As long as the heat from the heater element maintains the cut-out switch bimetal element at or above its transition temperature, the cut-out switch remains in the circuit-breaking condition. When the temperature of the cut-out switch bimetal element falls below its transition temperature, then the bimetal element transitions, i.e., moves, the movable conducting element back into a circuit-making condition. If the PTCR has sufficiently cooled, the start winding is once again energized.

By utilizing heat from the heater element, the bimetal element of the cut-out switch does not consume any energy other than energy that otherwise would be lost. Therefore, although the above described combination motor starter and protector module includes a PTCR, the module is believed to be more energy efficient than modules that require that the PTCR be maintained at a high temperature for the motor start winding to remain substantially disassociated from the motor power supply after motor start-up.

DETAILED DESCRIPTION OF THE DRAWINGS

Figure 1:
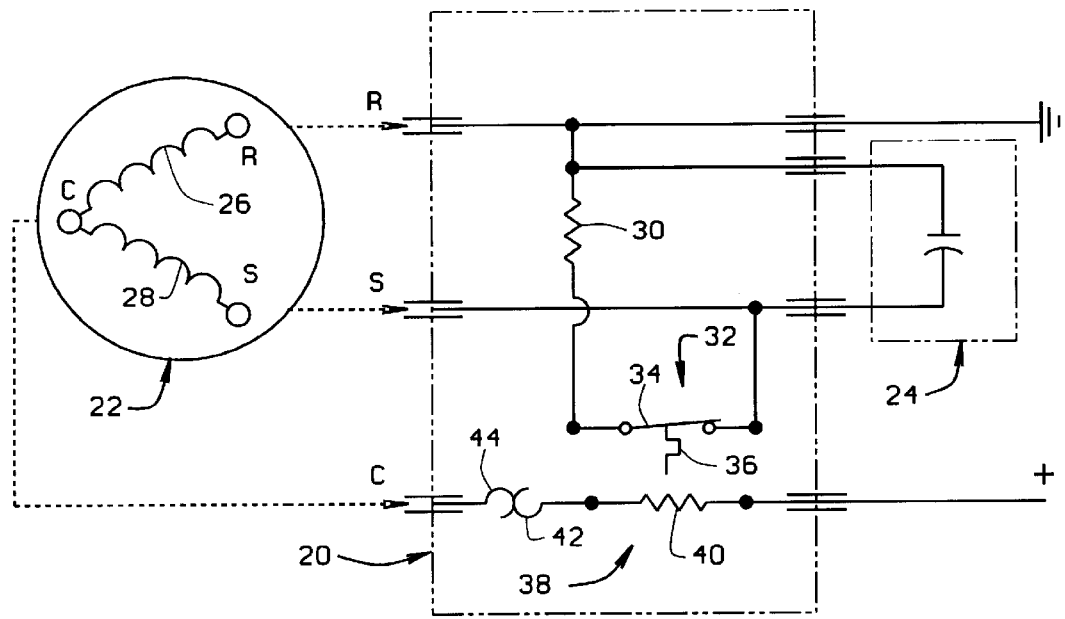
FIG. 1 is a circuit schematic of a motor starting and protector circuit including a run capacitor.

FIG. 1 is a circuit schematic of a combination starter and protector module 20 coupled to a motor 22 and a run capacitor 24. Motor 22 includes a run winding 26 and a start winding 28. Module 20 includes a positive temperature coefficient resistor 30 (PTCR) and a cut-out switch 32 electrically connected in series. PTCR 30, as hereinafter described in more detail, preferably is a disk type PTCR, such as a PTCR disk available from CeraMite, a company located in Grafton, Wisconsin. As is well known, a PTCR is operable generally in response to current flow therethrough to increase its resistance generally as a function of temperature. Cut-out switch 32 is illustrated as a bimetal type switch including a movable conducting element 34 and a bimetal element 36. Such a bimetal type switch is commercially available from Otter Controls, Limited, Hardwick Square South, Buxton, Derbyshire, SK17 6LA, England. For example, element 36 may be a snap action or a creep type bimetal element.

Module 20 also includes a protector unit 38. Protector unit 38 includes a heater element 40, a movable contact 42 and a stationary contact 44. Contacts 42 and 44 are illustrated in the circuit schematic as forming a bimetal-type switch. Specifically, movable contact 42 is controlled by a bimetal element responsive to current flow through contacts 42 and 44 as hereinafter described in more detail. Such a bimetal switch is commercially available from Otter Controls, Limited, Hardwick Square South, Buxton, Derbyshire, SK17 6LA, England. Heater element 40 is in series circuit and thermal communication with the protector unit bimetal element.

As shown in FIG. 1, protector unit 38 is in series circuit between the common terminal C of motor windings 26 and 28 and an energy source. PTCR 30 and cut-out switch 32 are in parallel circuit with run capacitor 24, and PTCR 30 and cut-out switch 32 are connected across run and start windings 26 and 28.

In operation, and for a "cold" start-up, the temperature of PTCR 30 is well-below the anomaly temperature, cut-out switch 32 is in its normal circuit-making condition, and movable contact 42 is in its normal circuit-making condition with stationary contact 44 of protector unit 38. Energy is supplied from the "+" terminal through protector unit 38 to common terminal C of motor 22. Both run and start windings 26 and 28 are energized.

In the "cold" start-up condition, PTCR 30 allows sufficient current to flow through start winding 28 so that the magnetic field of start winding 28 effects a desired starting torque during the start-up period. Also, during the start-up period, the resistance of PTCR 30 is sufficiently low so that run capacitor 24 is substantially electrically disassociated from motor windings 26 and 28 With run capacitor 24 substantially disassociated from windings 26 and 28, the magnetic field generated by start winding 28 is, for example, about 30° out-of-time phase from the magnetic field generated by run winding 26.

As the temperature of PTCR 30 increases in response to current flow therethrough to the anomaly or transition temperature, the resistance of PTCR 30 to current flow also increases to a value which generally electrically disassociates PTCR 30 from start winding 28. The resistance of PTCR 30 will not act to obviate current flow therethrough, but PTCR 30 will throttle or restrict the passage of such current flow to such a minimal or small value that PTCR 30 is substantially electrically disassociated from start winding 28. When PTCR 30 is substantially disassociated from start winding 28, run capacitor 24 is substantially associated with start winding 28. Under such conditions, start winding 28 functions as an auxiliary main winding.

In addition, and with respect to cut-out switch 32, when bimetal element 36 is heated to the calibrated "transition" temperature, bimetal element 36 "transitions", or moves, which causes movable conducting element 34 to move to the circuit-breaking condition. As a result, PTCR 30 cools and does not consume energy. As long as the heat from heater element 40 maintains cut-out switch bimetal element 36 at or above its transition temperature, cut-out switch 32 remains in the circuit-breaking condition.

Under normal start-up and running conditions, protector unit 38 is configured so as to allow motor 22 to remain energized. Protector unit 38 operates, however, to de-energize motor 22 under a fault condition such as a mechanically locked rotor, electrical failure of run winding 26 or start winding 28, a current overload condition, or high compressor shell and motor winding temperatures. Under such a fault condition, the temperature of the bimetal element increases and when such temperature reaches the calibrated "transition" temperature, the bimetal element "transitions", or moves, to its second configuration, which causes movable contact 42 to break away from stationary contact 44 into a circuit-breaking condition. In such a circuit-breaking condition, motor windings 26 and 28 are de-energized.

To re-energize motor windings 26 and 28, the protector unit bimetal element, heater element 40, cut-out switch bimetal element 36, and PTCR 30 must sufficiently cool. The protector bimetal element then transitions back to its first configuration which causes movable contact 42 to move back into a circuit-making condition with stationary contact 44, and bimetal element 36 moves back to its normal position so that cut-out switch 32 is in the circuit-making condition. Motor windings 26 and 28 are therefore re-energized and motor 22 again initiates operation in the start-up mode. If the condition which caused the fault has been corrected, motor 22 will continue to operate. However, if such condition has not been corrected, the protector unit bimetal element will again be heated to the calibrated "transition" temperature and movable contact 42 will move into its circuit-breaking condition. Motor 22 will again be de-energized.

There are, of course, many variations of the embodiment illustrated in FIG. 1. For example, run capacitor 24 and its circuit connections could be totally eliminated. PTCR 30 and cut-out switch 32 would then be in series circuit with start winding 28. With such a configuration, when the temperature of PTCR 30 increases to its anomaly or transition temperature, the resistance of PTCR 30 to current flow generally renders start winding 28 ineffective so as to electrically disassociate start winding 28 from run winding 26. In addition, when bimetal element 36 is heated to the calibrated "transition" temperature, bimetal element 36 "transitions" or moves, which causes movable conducting element 34 to move to the circuit-breaking condition. As a result, PTCR 30 cools and does not consume energy. As long as the heat from heater element 40 maintains cut-out switch bimetal element 36 at or above its transition temperature, cut-out switch 32 remains in the circuit-breaking condition and start winding 28 is electrically disassociated from run winding 26.

Figure 2:
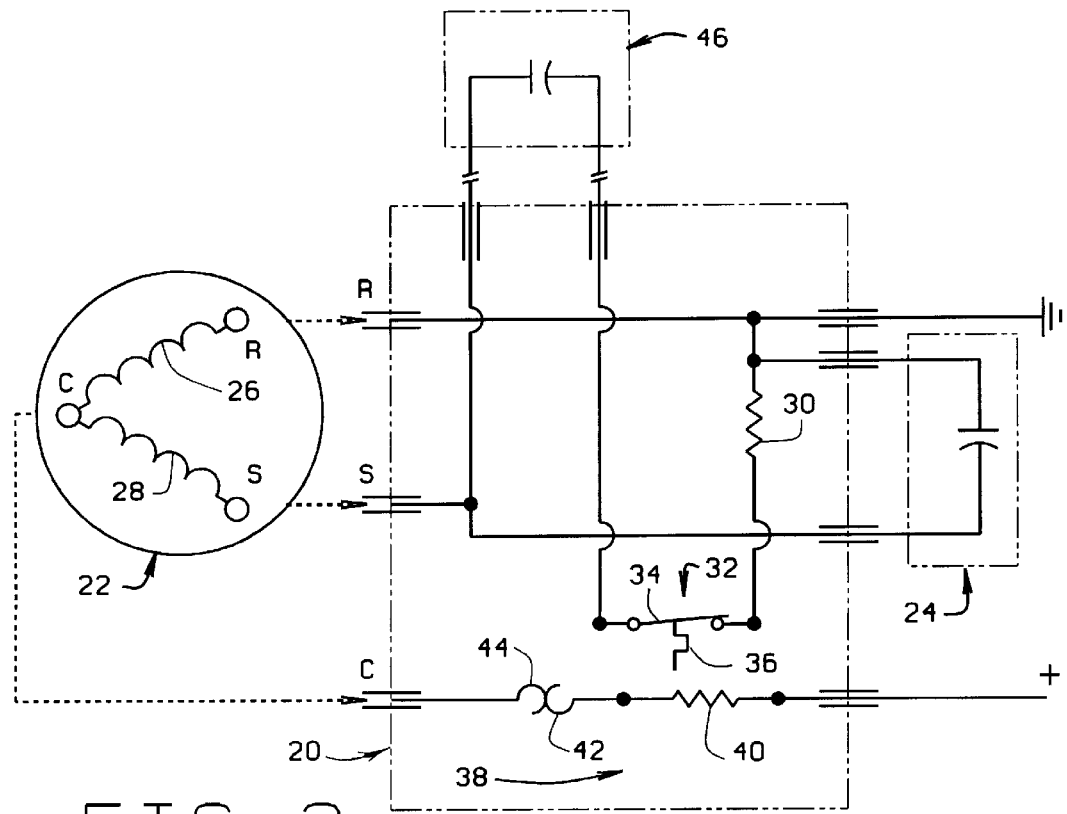
FIG. 2 is a circuit schematic of a motor starting and protector circuit including a start capacitor and a run capacitor.

Another configuration for combination motor starting device and protector module 20 is illustrated in FIG. 2. In the FIG. 2 circuit schematic, a start capacitor 46 is provided. Particularly, start capacitor 46 is connected in series circuit with cut-out switch 32 and PTCR 30. Operation of the FIG. 2 embodiment is substantially similar to operation of the FIG. 1 embodiment with the exception that with start capacitor 46 and during the start-up period, start capacitor 46 is electrically associated with start winding 28. As a result, and during the start-up period, the magnetic field generated by start winding 28 is, for example, about 90° rather than 30° out-of-time phase with the magnetic field generated by run winding 26.

When the temperature of PTCR 30 reaches the anomaly or transition temperature, PTCR 30 substantially disables or renders ineffective start capacitor 46. In addition, when bimetal element 36 is heated to the calibrated "transition" temperature, bimetal element 36 "transitions" or moves, which causes movable conducting element 34 to move to the circuit-breaking condition. As a result, PTCR 30 cools and does not consume energy. As long as the heat from heater element 40 maintains cut-out switch bimetal element 36 at or above its transition temperature, cut-out switch 32 remains in the circuit-breaking condition and start winding 28 is electrically disassociated from run winding 26.

The FIG. 2 embodiment could be modified to eliminate run capacitor 24 and its circuit connections. With such a configuration, start capacitor 46 is the only external capacitor. Operation of such a configuration is substantially similar to the operation as described above with respect to start capacitor 46. Run capacitor 24 and its associated affects are eliminated. Specifically, with run capacitor 24 eliminated, when PTCR 30 reaches its transition or anomaly temperature, start winding 28 is substantially disassociated from run winding 26.

PTCR 30 is selected to be the minimum size which satisfies resistance/current/voltage conditions to optimize the cooling rate of PTCR 30. An example of ratings of PTCR 30 are set forth below:

Cold Resistance: 5 ohms to 15 ohms, 180 vac, 12 amp

Maximum Curie Temp. 125° C.

5.5 ohms resistance at 25° C.

Life: 550,000 starts (minimum)

A PTCR satisfying the above ratings should effectively disconnect or take out the start winding in less than 0.75–1.0 seconds at 8.0 amps during the motor start-up for a cold start, and reset within 80 seconds in the event that power is cut-off.

With respect to cut-out switch 32, the temperature at which bimetal element 36 "transitions" or moves is selected based on motor current and application conditions so that element 36 transitions after PTCR 30 has reached its anomaly temperature but before protector 38 transitions to a circuit-breaking condition. For protector 38, the temperature at which the bimetal element "transitions" or moves is selected based on motor current and application conditions to keep the motor winding temperature to less than the maximum temperature specified by the compressor motor manufacturer. Further, if switch 32 fails, switch 32 preferably would fail in a closed circuit condition.

For protector 38, the bimetal element and contacts should have a minimum load life capability of approximately 20,000 operations. Such components also should have sufficient life to withstand 30 days of actual compressor locked rotor conditions. The above stated characteristics may, of course, vary from application to application.

The "transition" temperature of protector 38 preferably is within ±10° C. of a nominal calibration based on compressor testing. The reset temperature of protector 38 preferably is within ±15° C. of a specified nominal. The reset temperature of protector 38 preferably is not below 55° C. to assure that protector 38 will reset under all application conditions. As an example, the bimetal element transition temperature could be 130° C. and the reset temperature could be 70° C.

Many different variations and modifications of module 20 are contemplated. For example, protector 38 could include one of many various other switches or cut-out controls. Also, rather than PTCR 30, various other motor starting switches could be utilized.

With respect to housings for module 20, it is contemplated that many different types of housing could be utilized. One such housing is described, for example, in U.S. patent application Ser. No. 08/453,278, filed May 30, 1995 and assigned to the present assignee, which is hereby incorporated herein by reference. The housing described in the above referenced patent application would be modified to include sufficient space for cut-out switch 32 and so that cut-out switch 32 is in heat transfer relationship with heater 40.

With respect to the above described module 20, bimetal element 36 of cut-out switch 32 is heated by heater element 40, and as long as motor 22 is running, cut-out switch 32 is "locked out" and remains in the circuit-breaking condition and start winding 28 is electrically disassociated from run winding 26. Therefore, although the above described combination motor starting device and protector module includes PTCR 30, the requirement that PTCR 30 be maintained at a high temperature for motor start winding 28 to remain substantially disassociated from the motor power supply after motor start-up is substantially eliminated.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. Apparatus comprising: a motor starting device comprising a temperature responsive resistance element;

a cut-out switch electrically connected in series with said motor starting device; said cut-out switch configured to transition to a circuit-breaking condition at a transition temperature to reduce a motor start winding current to zero in the circuit-breaking condition; and a motor protector comprising a protector switch and a heater element electrically connected in series, said cut-out switch in heat transfer relationship with said heater element.

2. Apparatus in accordance with claim 1 wherein said temperature responsive resistance element is a positive temperature coefficient resistor.

3. Apparatus in accordance with claim 1 wherein said cut-out switch comprises a bimetal element, said bimetal element in heat transfer relationship with said heater element.

4. Apparatus in accordance with claim 1 wherein said protector switch comprises a bimetal switch having a movable contact and a stationary contact.

5. Apparatus in accordance with claim 1 wherein said motor starting device being connected in series with a motor start winding of an electric motor.

6. Apparatus in accordance with claim 1 farther comprising a start capacitor electrically connected in series with said motor starting device.

7. Apparatus in accordance with claim 1 further comprising a run capacitor electrically being connected in parallel with said motor starting device.

8. Apparatus in accordance with claim 1 wherein said cut-out switch comprises a movable conducting element and a bimetal element, said bimetal element connected to said movable conducting element.

9. A combination motor starting device and protector module, comprising:

a motor starting device comprising a temperature responsive resistance element;

a cut-out switch electrically connected in series with said motor starting device, said cut-out switch comprising a bimetal element; said cut-out switch configured to transition to a circuit-breaking condition at a transition temperature to reduce a motor start winding current to zero in the circuit-breaking condition; and a motor protector comprising a protector switch and a heater element electrically connected in series, said protector switch comprising a switch having a movable contact and a stationary contact, and a bimetal element controlling movement of said movable contact, said cut-out switch bimetal element and said protector switch bimetal element in heat transfer relationship with said heater element.

10. A combination motor starting device and protector module in accordance with claim 9 wherein said temperature responsive resistance element is a positive temperature coefficient resistor.

11. A combination motor starting device and protector module in accordance with claim 9 wherein said motor starting device being connected in series with a motor start winding of an electric motor.

12. A combination motor starting device and protector module in accordance with claim 9 further comprising a start capacitor electrically connected in series with said motor starting device.

13. A combination motor starting device and protector module in accordance with claim 9 further comprising a run capacitor being electrically connected in parallel with said motor starting device.

14. A combination motor starting device and protector module in accordance with claim 9 wherein said cut-out switch further comprises a movable conducting element, said bimetal element connected to said movable conducting element.

* * * * *